Oct. 27, 1925.
J. A. McCOY
LOCK WASHER
Filed Aug. 4, 1923
1,558,736
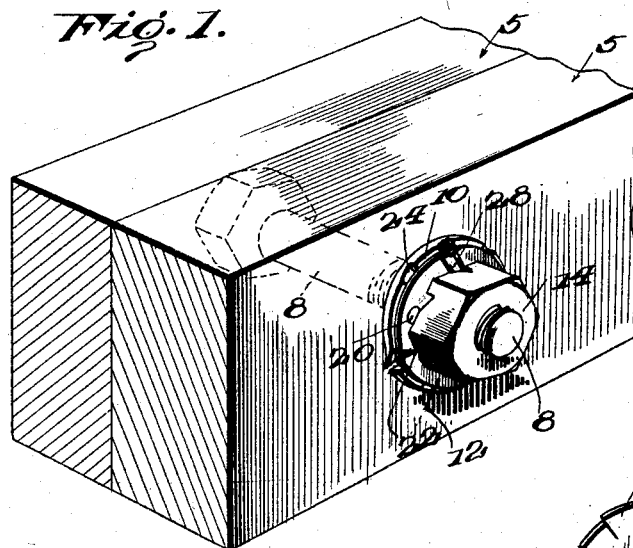
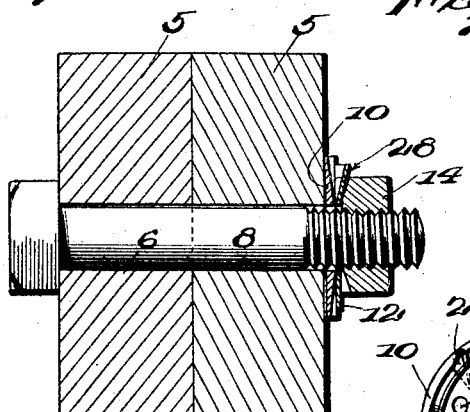
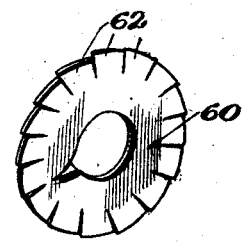
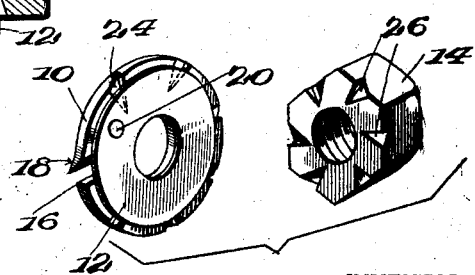
WITNESSES
INVENTOR
J. A. McCoy
BY
ATTORNEYS Patented Oct. 27, 1925.

1,558,736

UNITED STATES PATENT OFFICE.

JOHN ALAXANDER McCOY, OF WEED, CALIFORNIA.

LOCK WASHER.

Application filed August 4, 1923. Serial No. 655,583.

*To all whom it may concern:*

Be it known that I, JOHN ALAXANDER Mc-COY, a citizen of the United States, and resident of Weed, in the county of Siskiyou and State of California, have invented certain new and useful Improvements in Lock Washers, of which the following is a specification.

This invention relates to lock washers and has for one of its objects the provision of positive means whereby a nut may be held against accidental turning or loosening when applied to a bolt and in carrying out the invention I make novel use of a washer for holding the nut against turning as a result of vibration or other cause.

A further object is to provide a lock washer which is of highly simplified construction, durable in use and cheap to manufacture.

Other objects and advantages will be apparent during the course of the following description.

In the accompanying drawing, forming a part of this application and in which like numerals are employed to designate like parts throughout the same, Figure 1 is a perspective of the improved lock washer applied.

Figure 2 is a side elevation of the bolt equipped with the improved lock washer with the nut and washer in section.

Figure 3 is a group perspective illustrating the improved lock washer,

Figure 4 is a perspective of a variation of the lock washer.

In the drawing wherein for the purpose of illustration is shown a preferred embodiment of the invention, the numerals 5 designate several pieces of work of any character and which as illustrated in Figure 2 are formed with aligned openings 6 for the reception of a bolt 8.

In carrying out the invention main and supplemental washers 10 and 12 respectively are mounted on a bolt 8 between the work 5 and the nut 14 and it will be seen that the main washer 10 is provided with a radial slit or incision 16 and the end of the washer at the slit is provided with a sharpened diagonally extending lip or tooth 18 adapted to bite into the work so as to prevent accidental turning of the washer on the bolt.

The supplemental washer 12 is of rather light construction and is secured by riveting as indicated at 20 or welding or otherwise to the main washer and the periphery of the supplemental washer 12 is arranged within the periphery of the main washer.

By the particular arrangement of the periphery of washer 12 within that of washer 10, the washer 12 is less liable to be disarranged by accidental blows, and it also facilitates the use of the tool by which it is bent or upset into the notches of the nut and washer 10.

It might be said that the supplemental washer 12 is of ductile material and the same may be punched or upset into the space formed by the incision 16 as illustrated in Figure 1 so that the inwardly extending portion thus formed will additionally hold the supplemental washer 12 against turning on the main washer, should the connection at 20 become ruptured or broken. In this manner the said inwardly extending portion or radial rib 22 thus formed cooperates with the rivet or other fastening means 20. The metal forming the supplemental washer 12 may be punched into the notch formed by the radial incision 16 or into additional radial notches 24 in the outer surface of the main washer 10.

It will be seen that the notches 24 are approximately V-shaped in cross section and the walls thereof decrease in width toward the center of the washer.

More specifically the radial notches 24 are of segmental formation and one wall of each notch is inclined while the other wall is approximately at right angles to the plane of the washer.

This notch arrangement will prevent retrograde movement of 12 should the connection at 20 be ruptured.

The nut 14 may as illustrated in Figure 3 be provided on its inner side with radial notches 26 similar in shape to the notches 24, adapted to receive portions of the supplemental washer 12 when punched out by means of a suitable tool to form locking ribs 28.

The supplemental washer 12 is punched out at one or more points where the notches 24 register with the notches 26. Of course all the notches 24 do not register with the notches 26 and the material forming the supplemental washer 12 is punched out only at one or more points where the notches 24 and 26 do happen to register.

With reference to the foregoing description taken in connection with the accompanying drawing, it will be seen that a nut threaded on a bolt and secured by the improved lock washer is positively held against displacement and when it is desired to detach the nut it is merely necessary to hammer or otherwise force the locking ribs 28 inwardly so that the notches 26 will clear the same.

A lock washer constructed in accordance with this invention may be advantageously used in connection with railroad and other work and does not involve a radical departure from established practices so that the same will meet with approval when placed upon the market.

In the modified form of invention illustrated in Figure 4 the lock washer which is designated by the numeral 60 is provided with a plurality of partly severed portions constituting teeth 62 which are adapted to engage the associated main washer or the work. It will be seen that the radial incisions which define teeth 62 allow the teeth to be forced inwardly so that the same will be in position to engage the work.

The washer illustrated in Figure 4 may be possessed of sufficient resiliency to allow the teeth 62 to be engaged either with the work or with the nut.

Having thus described the invention, what is claimed is:

A combination locking washer of the character described, comprising a rigid split washer, a relatively thin washer of ductile metal superposed thereon and permanently secured thereto at a single point, and both of said washers having a central opening for mounting on a bolt, one end of said split washer bent downward obliquely and tapered to a knife edge adapted to bite into and imbed in the work to prevent retrograde rotary movement of said washer, said split washer also having radial V-shaped notches in its outer face, a nut carried on the bolt and having similar radial notches on its inner face adapted for alinement with the notches of the rigid washer, whereby portions of the ductile washer may be upset into locking engagement with the notches of the rigid washer and the nut, the periphery of the ductile washer disposed entirely within the periphery of the rigid washer whereby to protect said ductile washer from accidental blows, and also facilitate the use of the tool used to upset said ductile washer.

JOHN ALAXANDER McCOY.